(12) United States Patent
Liljedahl

(10) Patent No.: US 11,310,957 B2
(45) Date of Patent: Apr. 26, 2022

(54) REDUCTION OF WHEEL TRACKS FOR ROBOTIC LAWNMOWER

(71) Applicant: HUSQVARNA AB, Huskvarna (SE)

(72) Inventor: Marcus Liljedahl, Huskvarna (SE)

(73) Assignee: Husqvarna AB, Huskvarna (SE)

( * ) Notice: Subject to any disclaimer, the term of this patent is extended or adjusted under 35 U.S.C. 154(b) by 349 days.

(21) Appl. No.: 16/489,863

(22) PCT Filed: Jan. 24, 2018

(86) PCT No.: PCT/SE2018/050051
§ 371 (c)(1),
(2) Date: Aug. 29, 2019

(87) PCT Pub. No.: WO2018/160114
PCT Pub. Date: Sep. 7, 2018

(65) Prior Publication Data
US 2019/0380266 A1    Dec. 19, 2019

(30) Foreign Application Priority Data
Mar. 2, 2017    (SE) .................................. 1750226-1

(51) Int. Cl.
*A01D 34/00* (2006.01)
*G05D 1/02* (2020.01)
*A01D 34/64* (2006.01)

(52) U.S. Cl.
CPC .......... *A01D 34/008* (2013.01); *G05D 1/0265* (2013.01); *A01D 34/64* (2013.01); *G05D 2201/0208* (2013.01)

(58) Field of Classification Search
CPC .... A01D 34/008; A01D 34/64; G05D 1/0265; G05D 2201/0208; G05D 1/0259
See application file for complete search history.

(56) References Cited

U.S. PATENT DOCUMENTS

2012/0029756 A1   2/2012   Johnson et al.
2012/0085458 A1   4/2012   Wenzel
(Continued)

FOREIGN PATENT DOCUMENTS

CN   1659489 A   8/2005
CN   1659490 A   8/2005
(Continued)

OTHER PUBLICATIONS

International Search Report and Written Opinion for International Application No. PCT/SE2018/050051 dated May 3, 2018.
(Continued)

*Primary Examiner* — Brian P Sweeney
(74) *Attorney, Agent, or Firm* — Burr & Forman, LLP

(57) ABSTRACT

A robotic lawnmower system comprising a robotic lawnmower (100) and a signal generator (240) to which a cable (250, 260) is to be connected, the signal generator (240) being configured to transmit a signal (245) through the cable (250, 260). The robotic lawnmower (100) comprises: a sensor (170) configured to pick up magnetic fields generated by the signal (245) in the cable (250, 260) thereby receiving the signal (245) being transmitted and a controller (110). The controller (110) is configured to follow the cable (250, 260) at a distance by determining a received signal quality level and adapting the distance at which the robotic lawnmower (100) is following the cable at according to the determined signal quality level.

17 Claims, 4 Drawing Sheets

(56) References Cited

U.S. PATENT DOCUMENTS

| | | |
|---|---|---|
| 2013/0030609 A1 | 1/2013 | Jagenstedt |
| 2013/0184924 A1 | 7/2013 | Jagenstedt et al. |
| 2015/0373906 A1* | 12/2015 | Jagenstedt .............. B60L 8/003 701/24 |
| 2016/0014955 A1 | 1/2016 | Hans |

FOREIGN PATENT DOCUMENTS

| | | |
|---|---|---|
| CN | 103197672 A | 7/2013 |
| CN | 103838238 A | 6/2014 |
| CN | 104977929 A | 10/2015 |
| CN | 105009014 A | 10/2015 |
| EP | 3056959 A1 | 8/2016 |
| EP | 2959350 B1 | 4/2018 |
| EP | 3100126 B1 | 12/2018 |
| WO | 2014129944 A1 | 8/2014 |

OTHER PUBLICATIONS

Swedish Office Action and Search Report for Swedish Application No. 1750226-1, dated Sep. 12, 2017.

* cited by examiner

REDUCTION OF WHEEL TRACKS FOR ROBOTIC LAWNMOWER

TECHNICAL FIELD

This application relates to robotic lawnmowers and in particular to a system and a method for performing improved reduction of wheel tracks in a work area.

BACKGROUND

Automated or robotic power tools such as robotic lawnmowers are becoming increasingly more popular. In a typical deployment, a work area, such as a garden, is enclosed by a boundary cable with the purpose of keeping the robotic lawnmower inside the work area. The robotic lawnmower is typically configured to follow the boundary wire or a guide cable when searching for its charging station. As a robotic lawnmower has to be repeatedly charged, there is a risk of wheel tracks forming along such cables. Wheel tracks are here to be understood to not only include actual tracks made by wheels, but also the area under the robotic lawnmower as it moves along the cable, which will be cut more often than other areas of the work area, thus forming more or less distinct tracks showing where the robotic lawnmower has travelled.

Traditionally, the robotic lawnmower is configured to follow the boundary cable (and/or guide cable) at a distance. By varying the distance from time to time or each time the robotic lawnmower travels to the charging station—or also out from the charging station—a reduction in wheel tracks may be achieved.

However, as will be discussed in the below, the inventors have realized problems with this traditional manner of following the boundary cable.

Thus, there is a need for improved reduction of wheel tracks and for following the boundary cable.

SUMMARY

As will be disclosed in detail in the detailed description, the inventors have realized that the traditional manner of following a cable brings about at least two problems. It is therefore an object of the teachings of this application to overcome or at least reduce those problems by instead of simply following a cable based on a received amplitude level, the robotic lawnmower is instead configured to follow the cable based on the received signal strength which enables for a safer and more reliable navigation.

According to one aspect there is provided a robotic lawnmower system comprising a robotic lawnmower and a signal generator to which a cable is to be connected, the signal generator being configured to transmit a signal through the cable. The robotic lawnmower comprises: a sensor configured to pick up magnetic fields generated by the signal in the cable thereby receiving the signal being transmitted and a controller. The controller is configured to follow the cable at a distance by determining a received signal quality level and adapting the distance at which the robotic lawnmower is following the cable at according to the determined signal quality level.

In one embodiment the controller is further configured to follow the cable at a distance by determining a received signal amplitude level of the received signal and steering the robotic lawnmower so that the received amplitude level corresponds (substantially equal to) to a set amplitude level. The controller is also configured to determine if the received signal quality level has changed, and in response thereto adapt the set amplitude level, thereby adapting the distance at which the robotic lawnmower is following the cable at.

In one embodiment, the controller is further configured to follow the cable at a distance by steering the robotic lawnmower so that the received signal quality level corresponds (substantially equal to) to a set signal quality level.

It is also an object of the teachings of this application to overcome the problems by providing a method for use in a robotic lawnmower system comprising a robotic lawnmower and a signal generator to which a cable is to be connected, the signal generator being configured to transmit a signal through the cable, and the robotic lawnmower comprising: a sensor configured to pick up magnetic fields generated by the signal in the cable thereby receiving the signal being transmitted, wherein the method comprises: the robotic lawnmower following the cable at a distance by determining a received signal quality level and adapting the distance at which the robotic lawnmower is following the cable at according to the determined signal quality level.

In one embodiment, the method further comprises the robotic lawnmower following the cable at a distance by determining a received signal amplitude level of the received signal and steering the robotic lawnmower so that the received amplitude level corresponds (substantially equal to) to a set amplitude level; determining a received signal quality level; determining if the received signal quality level has changed, and in response thereto adapting the set amplitude level, thereby adapting the distance at which the robotic lawnmower is following the cable at.

In one embodiment, the method further comprises following the cable at a distance by steering the robotic lawnmower so that the received signal quality level corresponds (substantially equal to) to a set signal quality level.

Thus, wheel tracks in the lawn are reduced while maintaining the robustness and safety of the system, whereby the changing corridor width prevents tracks from being formed and the adaptability makes the system more robust. Also, due to the adaptation it is unlikely that the lawnmower will always be at the same distance from the boundary wire which further reduces the risk of tracks being formed. In the same manner, the risk of the lawnmower getting confused is significantly reduced.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

It should be noted that all indications of rotational speeds, time durations, work loads, battery levels, operational levels etc. are given as examples and may be varied in many different ways as would be apparent to a skilled person. The variations may be for individual entities as well as for groups of entities and may be absolute or relative.

Figure 1A:
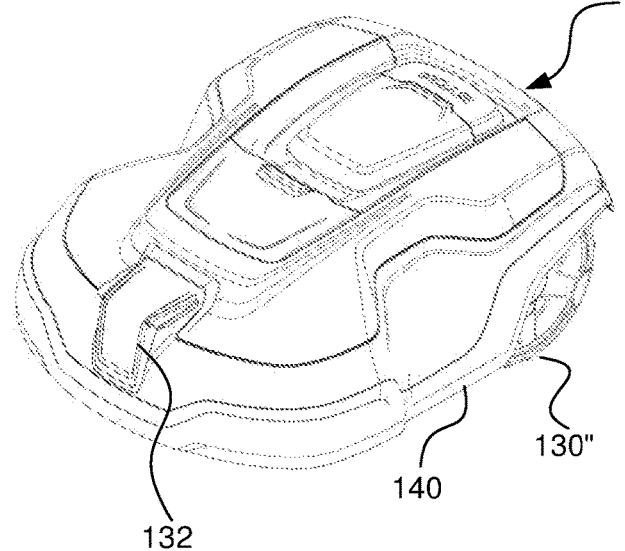
FIG. 1A shows an example of a robotic lawnmower according to one embodiment of the teachings herein.

FIG. 1A shows a perspective view of a robotic lawnmower 100, here exemplified by a robotic lawnmower 100, having a body 140 and a plurality of wheels 130 (only one shown). As can be seen, the robotic lawnmower 100 may comprise charging skids for contacting contact plates (not shown in FIG. 1, but referenced 230 in FIG. 2) when docking into a charging station (not shown in FIG. 1, but referenced 210 in FIG. 2) for receiving a charging current through, and possibly also for transferring information by means of electrical communication between the charging station and the robotic lawnmower 100.

Figure 1B:
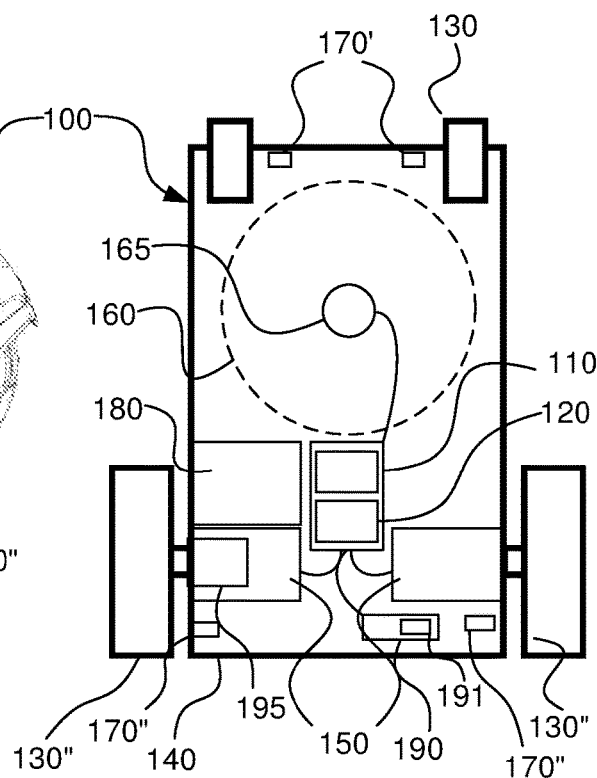
FIG. 1B shows a schematic view of the components of an example of a robotic lawnmower according to one embodiment of the teachings herein.

FIG. 1B shows a schematic overview of the robotic lawnmower 100, also exemplified here by a robotic lawnmower 100, having a body 140 and a plurality of wheels 130.

It should be noted that even though the description given herein will be focused on robotic lawnmowers, the teachings herein may also be applied to robotic cleaners such as robotic vacuum cleaners and/or robotic floor cleaners, robotic ball collectors, robotic mine sweepers, robotic farming equipment, o other robotic lawnmowers to be employed in a work area defined by a boundary cable.

In the exemplary embodiment of FIG. 1B the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1B, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further have at least one sensor 170; in the example of FIG. 1 there are four sensors divided into a first sensor pair 170' and a second sensor pair 170", respectively arranged at each wheel 130', 130" to detect a magnetic field (not shown) and for detecting a boundary cable and/or for receiving (and possibly also sending) information from a signal generator (will be discussed with reference to FIG. 2). The sensors 170 may thus be arranged as front sensors 170' and rear sensors 170".

In some embodiments, the sensors 170 may be connected to the controller 110, and the controller 110 may be configured to process and evaluate any signals received from the sensor pairs 170, 170'. The sensor signals may be caused by the magnetic field being generated by a control signal being transmitted through a boundary cable. This enables the controller 110 to determine whether the robotic lawnmower 100 is close to or crossing a boundary cable, or inside or outside an area enclosed by the boundary cable. This also enables the robotic lawnmower 100 to receive (and possibly send) information from the control signal.

The robotic lawnmower 100 also comprises a grass cutting device 160, such as a rotating blade 160 driven by a cutter motor 165. The grass cutting device being an example of a work tool 160 for a robotic lawnmower 100. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

The robotic lawnmower 100 may further comprise at least one supplemental navigation sensor 190, such as a deduced reckoning navigation sensor for providing signals for deduced reckoning navigation, also referred to as dead reckoning. Examples of such deduced reckoning navigation sensor(s) 190 are odometers and compasses. The supplemental navigation sensor may also or alternatively be implemented as a vision navigation system, or Ultra Wide Band radio navigation system to mention a few examples. The supplemental sensor 195 will hereafter be exemplified through the deduced reckoning sensor.

The robotic lawnmower 100 may further be arranged with a wireless communication interface 197 for communicating with other devices, such as a server, a personal computer or smartphone, or the charging station. Examples of such wireless communication devices are Bluetooth™, Global System Mobile (GSM) and LTE (Long Term Evolution), to name a few.

In addition, the robotic lawnmower 100 may be arranged with collision sensor means for detecting when the robotic lawnmower 100 runs into an obstacle. The collision sensor means may be one or more separate sensors (such as accelerometers, pressure sensors or proximity sensors) arranged in or on the housing of the robotic lawnmower 100 and capable of detecting an impact caused by a collision between the robotic lawnmower 100 and an obstacle. Alternatively, the collision sensor means may be implemented as a program routine run by the controller 110, being effective to detect a sudden decrease of the rotational speed of any of the drive wheels 130" and/or sudden increase in the drive current to the electric motor 150.

Figure 2:
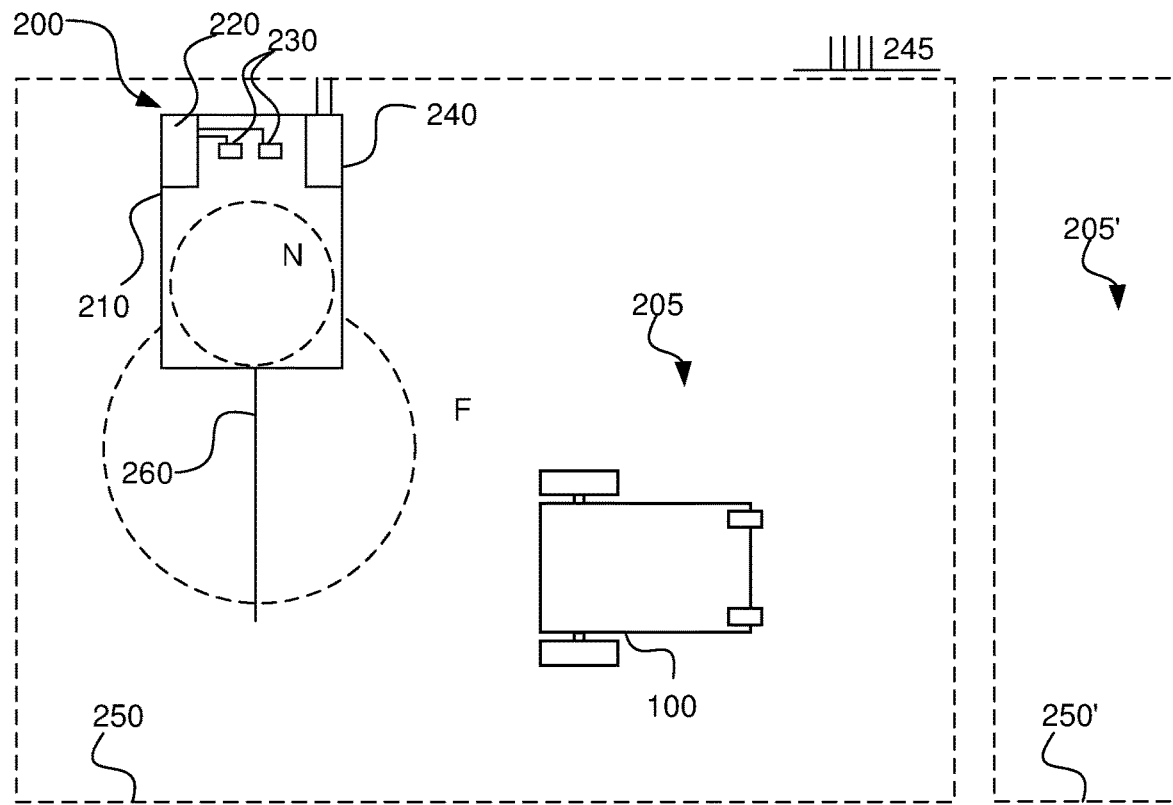
FIG. 2 shows an example of a robotic lawnmower system according to the teachings herein.

FIG. 2 shows a schematic view of a robotic lawnmower system 200 in one embodiment. The schematic view is not to scale. The robotic lawnmower system 200 comprises a charging station 210 and a boundary cable 250 arranged to enclose a work area 205, in which the robotic lawnmower 100 is supposed to serve. Adjacent to the work area 205 is another work area 205' enclosed by a boundary 250'. Although not shown, in some embodiments, the other work area 205' may also comprise a charging station and robotic lawnmower deployed within.

The adjacent work area 205' and the enclosing boundary wire 250' will serve as one example of a source of disturbance or interference in this application.

As with FIG. 1, the robotic lawnmower is exemplified by a robotic lawnmower, but the teachings herein may also be applied to other robotic lawnmowers adapted to operate within a work area defined by a boundary cable.

The charging station may have a base plate 215 for enabling the robotic lawnmower to enter the charging station in a clean environment and for providing stability to the charging station 210.

The charging station 210 has a charger 220, in this embodiment coupled to two charging plates 230. The charging plates 230 are arranged to co-operate with corresponding charging plates (not shown) of the robotic lawnmower 100 for charging the battery 180 of the robotic lawnmower 100.

The charging station 210 also has, or may be coupled to, a signal generator 240 for providing a control signal 245 to be transmitted through the boundary cable 250. The signal generator thus comprises a controller for generating the control signal. The control signal 245 comprises an alternating current, such as a continuously or regularly repeated current signal. The control signal may be a CDMA signal (CDMA—Code Division Multiple Access). The control signal may also or alternatively be a pulsed control signal, the control signal thus comprising one or more current pulses being transmitted periodically. The control signal may also or alternatively be a continuous sinusoidal wave. As is known in the art, the current signal will generate a magnetic field around the boundary cable 250 which the sensors 170 of the robotic lawnmower 100 will detect. As the robotic lawnmower 100 (or more accurately, the sensor 170) crosses the boundary cable 250 the direction of the magnetic field will change. The robotic lawnmower 100 will thus be able to determine that the boundary cable has been crossed, and take appropriate action by controlling the driving of the rear wheels 130" to cause the robotic lawnmower 100 to turn a certain angular amount and return into the work area 205. For its operation within the work area 205, in the embodiment of FIG. 2, the robotic lawnmower 100 may alternatively or additionally use the satellite navigation device 190, supported by the deduced reckoning navigation sensor 195 to navigate the work area 205.

Additionally, the robotic lawnmower 100 may use the satellite navigation device 190 to remain within and map the work area 205 by comparing the successive determined positions of the robotic lawnmower 100 against a set of geographical coordinates defining the boundary 250, obstacles, keep-out areas etc of the work area 205. This set of boundary defining positions may be stored in the memory 120, and/or included in a digital (virtual) map of the work area 205. The boundary 250 of the work area 205 may also be marked by a boundary cable supplementing the GNSS navigation to ensure that the robotic lawnmower stays within the work area, even when no satellite signals are received.

The charging station 210 may also be arranged (through the signal generator 240) to emit a so-called F-field, referenced F in FIG. 2. The F-field is a magnetic field generated around the charging station which enables a robotic lawnmower to navigate towards the charging station 210 without having to follow a guide or boundary cable, simply by navigating towards an increased field strength of the F-field.

The charging station 210 may also be arranged (through the signal generator 240) to emit a so-called N-field, referenced N in FIG. 2. The N-field is a magnetic field generated in the base plate 215 of the charging station which enables a robotic lawnmower to navigate correctly in the charging station for making contact with the charging plates 230.

The use of more than one sensor 170 enables the controller 110 of the robotic lawnmower 100 to determine how the robotic lawnmower 100 is aligned with relation to the boundary cable 250 by comparing the sensor signals received from each sensor 170. This enables the robotic lawnmower to follow the boundary cable 250, for example when returning to the charging station 210 for charging. Optionally, the charging station 210 may have a guide cable 260 for enabling the robotic lawnmower to find the entrance of the charging station 210. In some embodiments the guide cable 260 is formed by a loop of the boundary cable 250. In some embodiments the guide wire 260 is used to generate a magnetic field for enabling the robotic lawnmower 100 to find the charging station without following a guide cable 260.

As has been discussed in the background section, always following the boundary cable closely may result in wheel tracks (including the cut area under the travelling robotic lawnmower). To overcome this, the robotic lawnmower is set to follow the cable at a distance that is changed from time to time (possibly every time). The distance may be set by an operator by setting a corridor width, and the distance is then set as a distance within the specified corridor. This allows for user control without having to provide a new setting every time the robotic lawnmower is set to operate. The robotic lawnmower is traditionally configured to follow the boundary (or guide) cable at a distance by maintaining the robotic lawnmower at a distance giving a more or less constant received amplitude of the received control signal. The robotic lawnmower may thus follow the cable at a distance, by continuously or repeatedly determining a amplitude of the sensed magnetic field being caused by the control signal (hereafter this magnetic field will be referred to as the received control signal) and determining whether the received signal strength is higher, substantially equal to, or less than the set amplitude corresponding to the wanted distance. In this context, substantially equal is to be taken as equal within an error margin. The error margin may for example be +/−5% or for example +/−10%.

Figure 3:
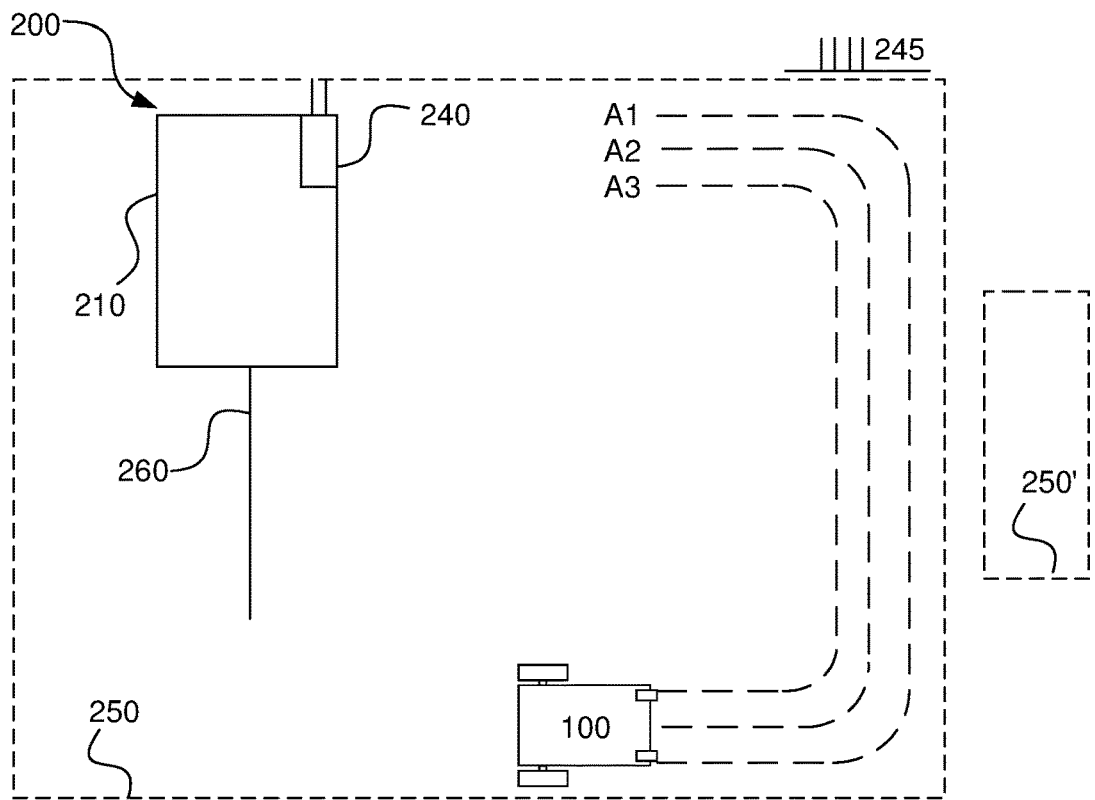
FIG. 3 shows a schematic overview of a robotic lawnmower system, such as that in FIG. 2, in which a robotic lawnmower is configured to follow a cable according to the teachings herein.

FIG. 3 shows a schematic overview of a robotic lawnmower system 200, such as that in FIG. 2, in which a robotic lawnmower 100 is configured to follow a cable such as a guide cable 260 or a boundary cable 250. The robotic lawnmower 100 may follow the cable 250 at different distances here exemplified by three dashed lines corresponding to three different amplitude levels A1, A2 and A3.

However, the inventors have realized that there are two problems with such an arrangement. The first problem is that over time, wheel tracks may also be formed within the corridor. Suggestions such as moving at a constantly varying distance within the corridor have been proposed to overcome this problem partially, but not fully and may also lead to difficulties in traversing between different work areas.

The second problem is that—at least for larger corridors—the robotic lawnmower may lose the signal or synchronization with the signal when following the cable in a wide corridor and when there is interference or other disturbances, at which times the received control signal may not be received at a good enough quality level to successfully follow it.

Figure 4:
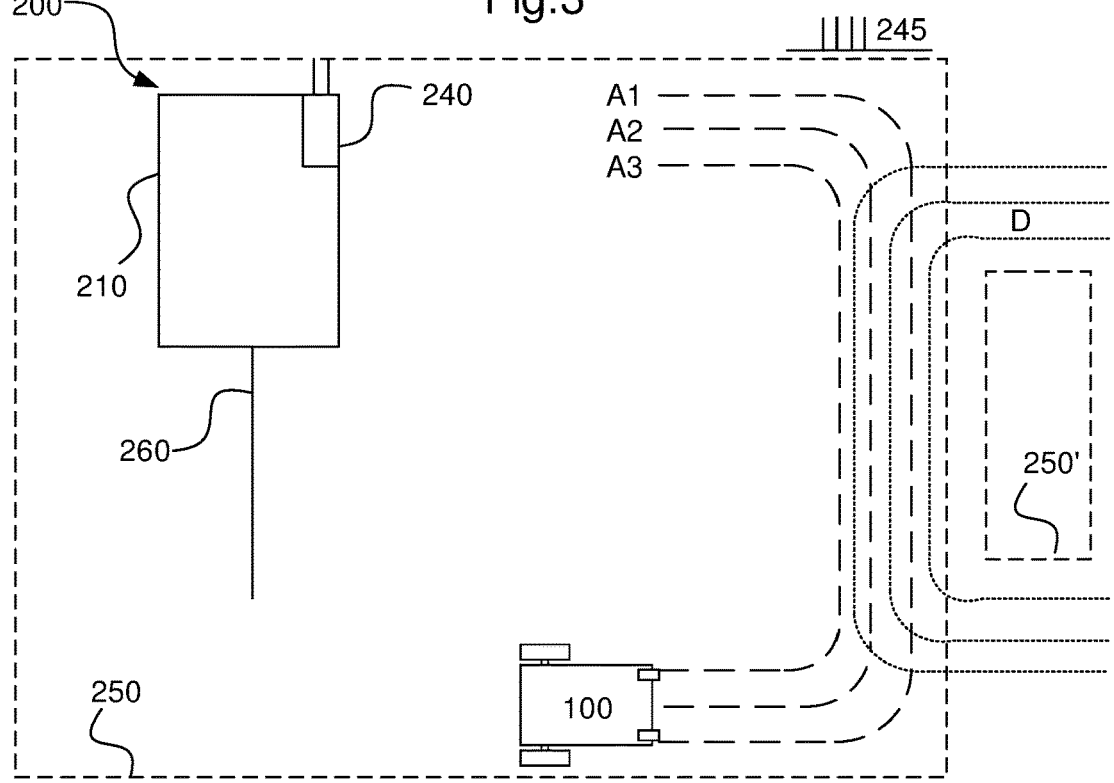
FIG. 4 shows a schematic overview of a robotic lawnmower system, such as that in FIG. 2 or 3, in which a robotic lawnmower is configured to follow a cable according to the teachings herein.

FIG. 4 shows a schematic overview of a robotic lawnmower system 200, such as that in FIG. 2 or 3, in which a source of disturbance or interference is shown 250'. As in the example of FIG. 2, the source of interference may be an adjacent work area enclosed by a boundary cable 250'. As would be apparent, other sources of interference may also be present, such as Radio frequency receivers or transmitters to mention but one example. The disturbance or interference caused by the source of interference is illustrated in FIG. 4 as dotted lines marked D for disturbance. It should be noted that for the purpose herein, there is not made any difference between nose, interference or other disturbances.

The inventors have, after insightful and inspired reasoning, come up with a simple and efficient manner of solving both these problems, and also others, at the same time, without requiring any structural modifications to a robotic lawnmower.

The solution proposed herein is to continuously or repeatedly monitor the received signal level as before, but also to determine a signal quality level. As would be apparent to a skilled reader there are many ways of measuring the signal quality, both in absolute terms and in relative terms. One example would be to calculate a Signal-to-Noise Ratio (SNR). Here it should be noted that the quality of a signal is not the same as the amplitude or strength of a signal. A signal may very well have a high signal strength, but still suffer from a low quality, or vice versa, namely low amplitude but a high quality. It should be clear that there is a distinction between the amplitude and the quality of a signal, as the disclosure herein and the claims make a clear distinction between them.

In one embodiment, the robotic lawnmower is further configured to determine that the received signal quality is changing and in response thereto adapt the distance at which the cable is to be followed.

In one embodiment, the robotic lawnmower is configured to determine that the signal quality level is changing, by determining an actual change and in response thereto adapt the distance—or amplitude level—at which the cable is to be followed.

In one embodiment, the robotic lawnmower is alternatively or additionally configured to determine that the signal quality level is changing, by determining that the signal quality level has passed (that is the signal quality level is above or below) a threshold level and in response thereto adapt the distance—or amplitude level—at which the cable is to be followed.

The robotic lawnmower is, in one embodiment, configured to adapt the distance—or amplitude level—at which the cable is to be followed stepwise. For example, in an implementation where several amplitude levels (A1, A2, A3) are possible and the robotic lawnmower is set to follow at a first amplitude level, say A2, the robotic lawnmower is then configured to adapt the distance by selecting a closer amplitude level, say A3, if it is determined that the interference is increasing, or to select a more remote amplitude level, say A1, if it is determined that the interference is increasing. The amount that the distance to be followed is adapted, may be a constant step or it may be proportionate to the change in signal quality resulting in several steps.

The robotic lawnmower is, in one embodiment, configured to adapt the distance—or amplitude level—at which the cable is to be followed proportionately to the change in signal quality level. For example, an increase of 25% in interference may result in a decrease of the distance by 25%. The amount of adaptation may not correspond exactly to the change in signal quality but may be modified by a scaling factor (25% change would result in 12% change).

The robotic lawnmower is, in one embodiment, configured to adapt the distance—or amplitude level—at which the cable is to be followed proportionately to the change in signal quality level relative a reference value. For example, if the received signal quality level is 3/4 of the reference signal quality level, the adapted distance is set to 4/3 of the reference distance. In one embodiment, the reference quality level is set to be the current received signal quality level.

In one embodiment, the reference distance/amplitude is set to be the current distance/amplitude.

Figure 5:
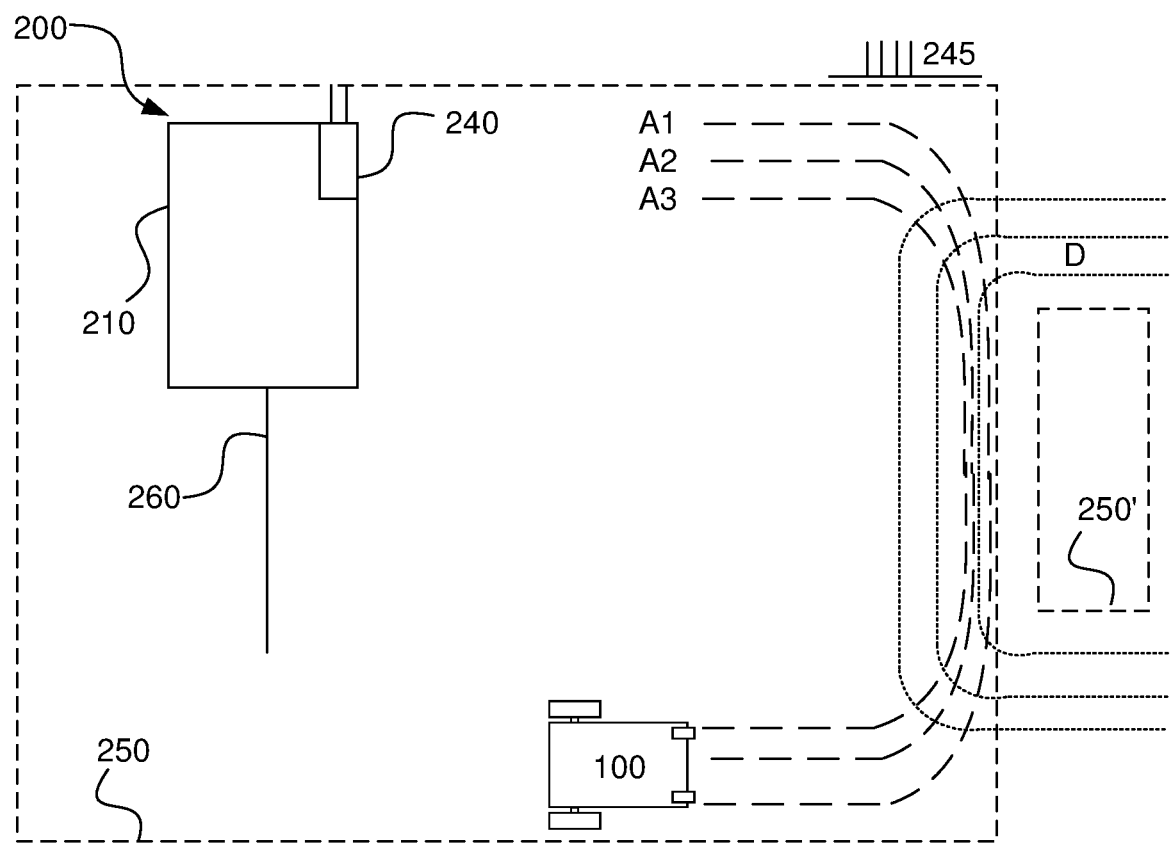
FIG. 5 shows a schematic overview of a robotic lawnmower system, such as that in FIG. 2, 3 or 4, in which a robotic lawnmower is configured to follow a cable according to the teachings herein.

FIG. 5 shows a schematic overview of a robotic lawnmower system 200, such as that in FIGS. 2, 3 and 4 in which the robotic lawnmower 100 has adapted the distance in the vicinity of the source of interference 250', i.e. where the interference is higher. Starting in the direction of the robotic lawnmower 100, assumed to follow the boundary cable from the lower edge, rightwards, turning upwards to follow the right edge, and finally turning left to follow the upper edge leftwards to the charging station 210, the robotic lawnmower follows the cable at a first distance A1, A2, A3 and as the robotic lawnmower detects that the signal quality level is changed, due to the increase in interference indicted by the dotted lines D, the robotic lawnmower 100 adapts the distance A1, A2, A3 at which the robotic lawnmower follows the cable by decreasing the distance, i.e. increasing the amplitude at which the robotic lawnmower follows the cable. This is illustrated in FIG. 5 by the dashed lines indicating the amplitude levels/distances are drawn closer to the boundary cable. The robotic lawnmower is now enabled to follow the cable 250 more securely despite the interference. Subsequently, the robotic lawnmower detects or determines that the signal quality level increases, as the robotic lawnmower 100 moves away from the source of interference 250', and adapts the distance/amplitude at which the cable is followed by increasing the distance, i.e. decreasing the amplitude. The example of FIG. 5 shows a continuous or proportionate adaptation of the distance, but as has been disclosed in the above other possibilities exist and are all considered to be part of the teachings herein.

As sources of interference may be more or less static/permanent, for example a mobile phone that is sued in a garden is not always used at the same place and also not always used, this also provides for a non-static following of the border cable, in that the distance will be changed according to the changing interferences, thus the first problem is also solved by providing a manner of following the border cable that changes in a possibly unreliable manner.

Figure 6:
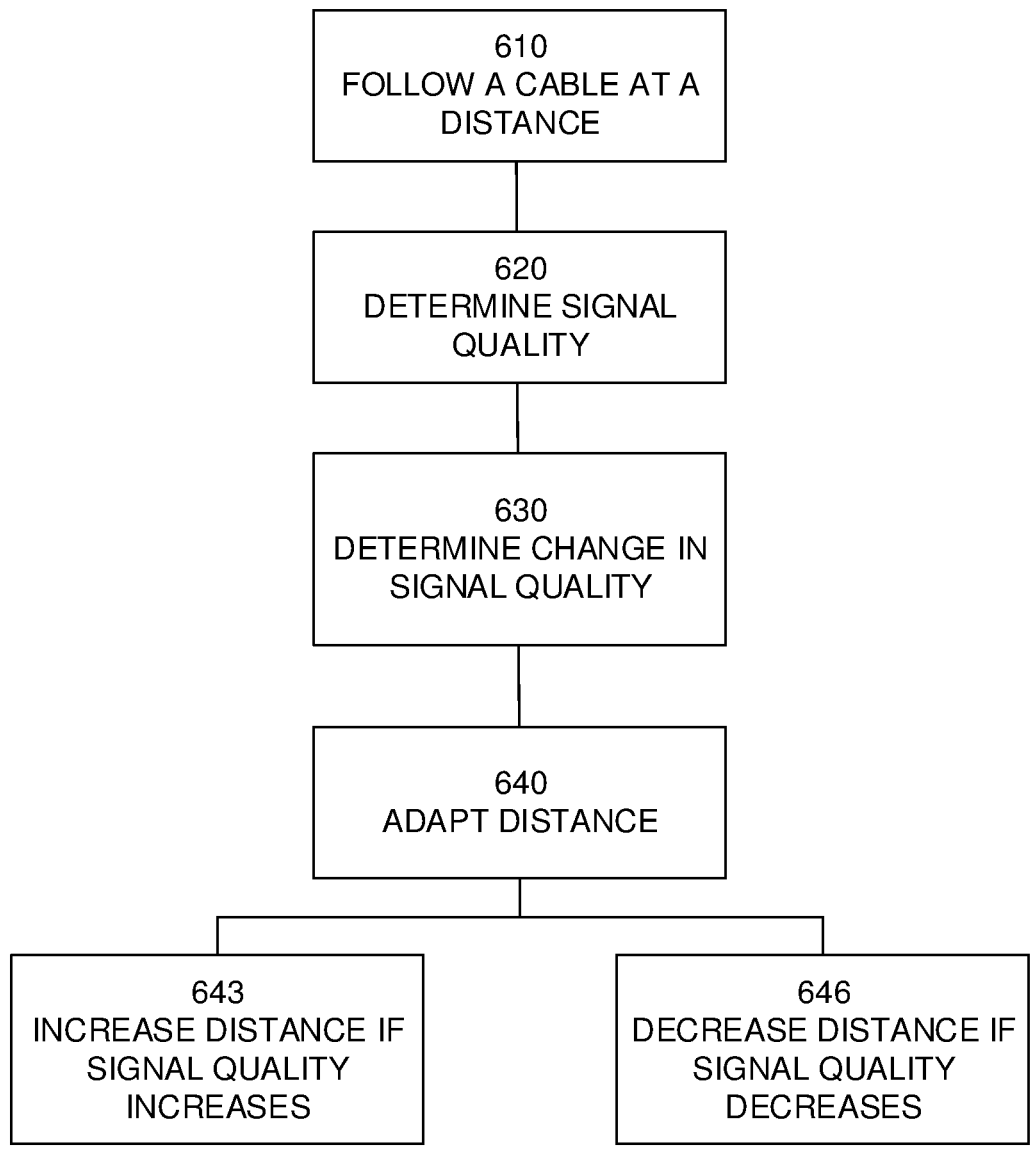
FIG. 6 shows a corresponding flowchart for a method according to an example embodiment.

FIG. 6 shows a flowchart for a general method according to herein where the robotic lawnmower 100 is arranged for following 610 the cable (250, 260) at a distance by determining a received signal amplitude level of the received signal and steering the robotic lawnmower so that the received amplitude level corresponds (substantially equal to) to a set amplitude level. The robotic lawnmower determines 620 a received signal quality level and determines 630 if the received signal quality level has changed, and in response thereto adapts 640 the set amplitude level, thereby adapting the distance at which the robotic lawnmower (100) is following the cable at. The robotic lawnmower adapts the amplitude by increasing 643 the amplitude, thereby decreasing the distance, when it is determined that the received signal quality level is decreasing, and adapts the amplitude by decreasing 646 the amplitude, thereby increasing the distance, when it is determined that the received signal quality level is increasing.

In one embodiment, the robotic lawnmower is configured to follow the cable at a distance set by the received signal strength and controlling the movement of the robotic lawnmower so that a (relatively) constant signal strength is maintained. In such an embodiment the controller is configured to determine a received signal quality level and adapting the distance at which the robotic lawnmower is following the cable at according to the determined signal quality level by steering the robotic lawnmower so that the received signal quality level corresponds (substantially equal to) to a set signal quality level. Thus the robotic lawnmower receives the magnetic field caused by the transmitted signal, determines a signal strength and compares this to a set signal strength level. If the received signal strength is above the set signal strength, the robotic lawnmower steers away from the cable.

In one embodiment, the robotic lawnmower is configured to adapt the distance by adapting a corridor width associated with the distance. In doing so, the distance will also be adapted. The robotic lawnmower may in one embodiment, adapt the distance at substantially the same time as the corridor is adapted. The distance may then be adapted in a corresponding manner, or it may be adapted by selecting a new distance from the distances available within the corridor. In this context a corridor is understood to mean a maximum distance or distance interval from the cable that the robot is to remain within while following the cable. The corridor may be adapted in the same manner as has been disclosed for adapting the distance.

In one embodiment, the signal generator 240 may be configured to adapt the amplitude of the transmitted signal and thereby changing the distance at which the robotic lawnmower follows the cable at.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic lawnmower system comprising a robotic lawnmower and a signal generator to which a cable is to be connected, the signal generator being configured to transmit a signal through the cable, and the robotic lawnmower comprising:

a sensor configured to pick up magnetic fields generated by the signal in the cable thereby receiving the signal being transmitted, and a controller configured to interface with the sensor to:
  follow the cable at a distance by determining a received signal amplitude level of the received signal, and steering the robotic lawnmower so that the received signal amplitude level corresponds to a set amplitude level;
  determine a received signal quality level; and
  determine if the received signal quality level has changed, and in response thereto adapt the set amplitude level thereby adapting the distance at which the robotic lawnmower is following the cable according to the received signal quality level determined.

2. The robotic lawnmower system according to claim 1, wherein the controller is further configured to adapt the set amplitude level proportionately to an amount of change in the received signal quality level.

3. The robotic lawnmower system according to claim 2, wherein the controller is further configured to adapt the set amplitude level based on a reference amplitude level.

4. The robotic lawnmower system according to claim 3, wherein the reference amplitude level is the set amplitude level prior to adaptation.

5. The robotic lawnmower system according to claim 1, wherein the controller is further configured to adapt the set amplitude level step wise.

6. The robotic lawnmower system according to claim 1, wherein the controller is further configured to determine that the received signal quality level has changed by determining that the received signal quality level has passed a threshold level.

7. The robotic lawnmower system according to claim 1, wherein the controller is further configured to determine that the received signal quality level has changed by comparing the received signal quality level with a reference signal quality level.

8. The robotic lawnmower system according to claim 7, wherein the reference signal quality level is the received signal quality level previously determined.

9. The robotic lawnmower system according to claim 1, wherein the controller is further configured to adapt the set amplitude level by increasing the set amplitude level when it is determined that the received signal quality level is decreasing thereby decreasing the distance, and
 adapt the set amplitude level by decreasing the set amplitude level when it is determined that the received signal quality level is increasing thereby increasing the distance.

10. The robotic lawnmower system according to claim 1, wherein the controller is further configured to follow the cable at a distance by steering the robotic lawnmower so that the received signal quality level corresponds to a set signal quality level.

11. The robotic lawnmower system according to claim 1, wherein the controller is further configured to adapt the distance by adapting a corridor.

12. The robotic lawnmower system according to claim 11, wherein the controller is further configured to adapt the distance at substantially a same time as adapting the corridor.

13. The robotic lawnmower system according to claim 12, wherein the controller is further configured to adapt the distance by selecting a new distance within the corridor.

14. The robotic lawnmower system according to claim 1, wherein the signal generator is configured to adapt an amplitude of the signal transmitted and thereby changing the distance at which the robotic lawnmower follows the cable at.

15. The robotic lawnmower system according to claim 1, wherein the cable is a boundary cable.

16. A method for use in a robotic lawnmower system comprising a robotic lawnmower and a signal generator to which a cable is to be connected, the signal generator being configured to transmit a signal through the cable, and the robotic lawnmower comprising:
   a sensor configured to pick up magnetic fields generated by the signal in the cable thereby receiving the signal being transmitted, and
   a controller operably coupled to the sensor to execute the method,
   wherein the method comprises: following the cable at a distance by:
      determining a received signal amplitude level of the received signal and steering the robotic lawnmower so that the received signal amplitude level corresponds to a set amplitude level;
      determining a received signal quality level; and
      determining if the received signal quality level has changed, and in response thereto adapt the set amplitude level thereby adapting the distance at which the robotic lawnmower is following the cable at according to the received signal quality level determined.

17. The method according to claim 16, wherein the method further comprises following the cable at the distance by steering the robotic lawnmower so that the received signal quality level corresponds to a set signal quality level.

* * * * *